June 8, 1965  M. W. GIESKIENG  3,188,464
RAILWAY WHEEL DEFECT DETECTOR
Filed July 9, 1962  2 Sheets-Sheet 1

INVENTOR.
MARION W. GIESKIENG
BY
ATTORNEY

June 8, 1965  M. W. GIESKIENG  3,188,464
RAILWAY WHEEL DEFECT DETECTOR
Filed July 9, 1962  2 Sheets-Sheet 2
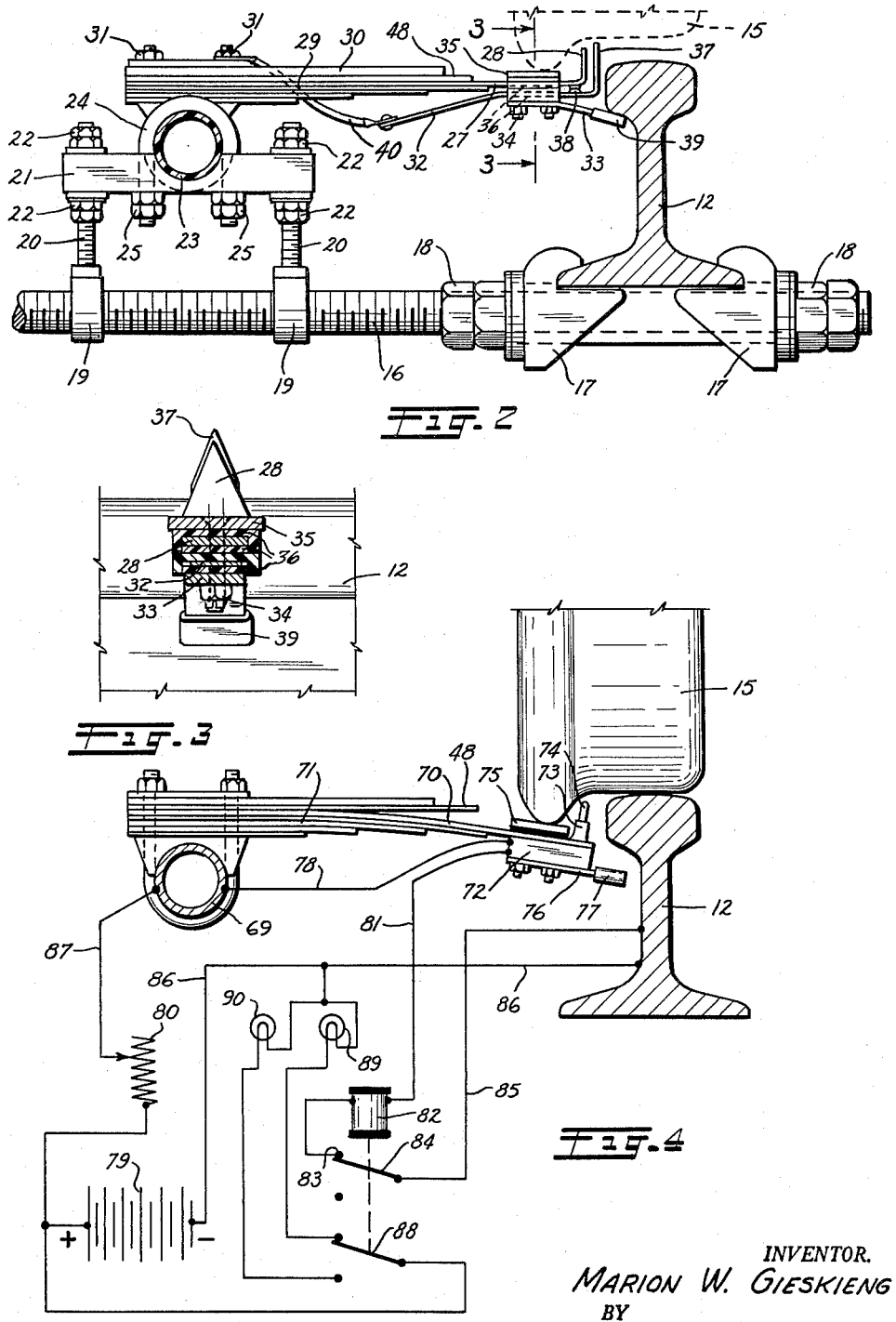
INVENTOR.
MARION W. GIESKIENG
BY
ATTORNEY United States Patent Office 3,188,464
Patented June 8, 1965

3,188,464
RAILWAY WHEEL DEFECT DETECTOR
Marion W. Gieskieng, 1333 S. Franklin St.,
Denver, Colo.
Filed July 9, 1962, Ser. No. 208,246
5 Claims. (Cl. 246—246)

This invention relates to a railway wheel defect detector of the general type as illustrated and described in applicant's prior Patents Nos. 2,574,474, 2,590,603, and No. 2,605,392.

The principal object of the invention is to provide a highly efficient wheel defect detecting device which can be readily and economically applied to the rails of a conventional railway for giving a signal indication should there be defects in a wheel or wheels of a passing car or train so that the car can be removed for repair before mainline damage occurs.

Such devices are subjected to exceedingly rough usage and must withstand extreme weather conditions which may result in breaks or shorts in the circuit wiring and poor or insufficient electrical contacts in the various circuit closing elements, thus, interfering with the efficient operation of the detecting device.

A further object of this invention is to provide an electric wheel defect detector of the above type which will "fail safe," that is, should any accidental breaks occur at any point in the signal and control circuits, an immediate warning signal will be given and further to provide a wheel contact device of the type shown in the above patents which will continue to operate efficiently even though a wheel of a passing car should be made of wood or pressed fiber or plastic or other electric insulating material, or should the wheel be provided with a rubber tread, or should the wheel be in such another condition as to be unable to conduct electric current from the rail to the detecting contacts of the detector.

A further object is to provide a wheel defect detecting device, of the type having electrical contact fingers which close a signal actuating circuit through a damaged wheel, with a second contact on each of the fingers which will also close the signal actuating circuit and in addition will open a circuit upon the passing of the damaged wheel which will also actuate said signal circuit so as to provide triple assurance that the signal circuit will be actuated should either contact fail to function.

Attempts have been made to place a plurality of series connected switches along a rail to be actuated by a damaged wheel to open a closed circuit to actuate a signal. These attempts have not been satisfactory since it is possible, due to mechanical damage and weather conditions, for two or more of the switches to become grounded to the rail, thus maintaining the circuit closed and giving a "safe" indication even though switches intermediate the ground are open.

A still further object of this invention is to combine with a closed series circuit a second open circuit which when closed by accidental shorts between the detector and the rail will given an indication that the detector is not in service condition.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 2 is an enlarged fragmentary cross section taken on the line 2—2, FIG. 1;

FIG. 3 is a still further enlarged detail cross section taken on the line 3—3, FIG. 2; and FIG. 4 is a cross section similar to the cross section of FIG. 2 illustrating an alternate arrangement of the invention with its connecting circuits, to be later described.

Figure 1:
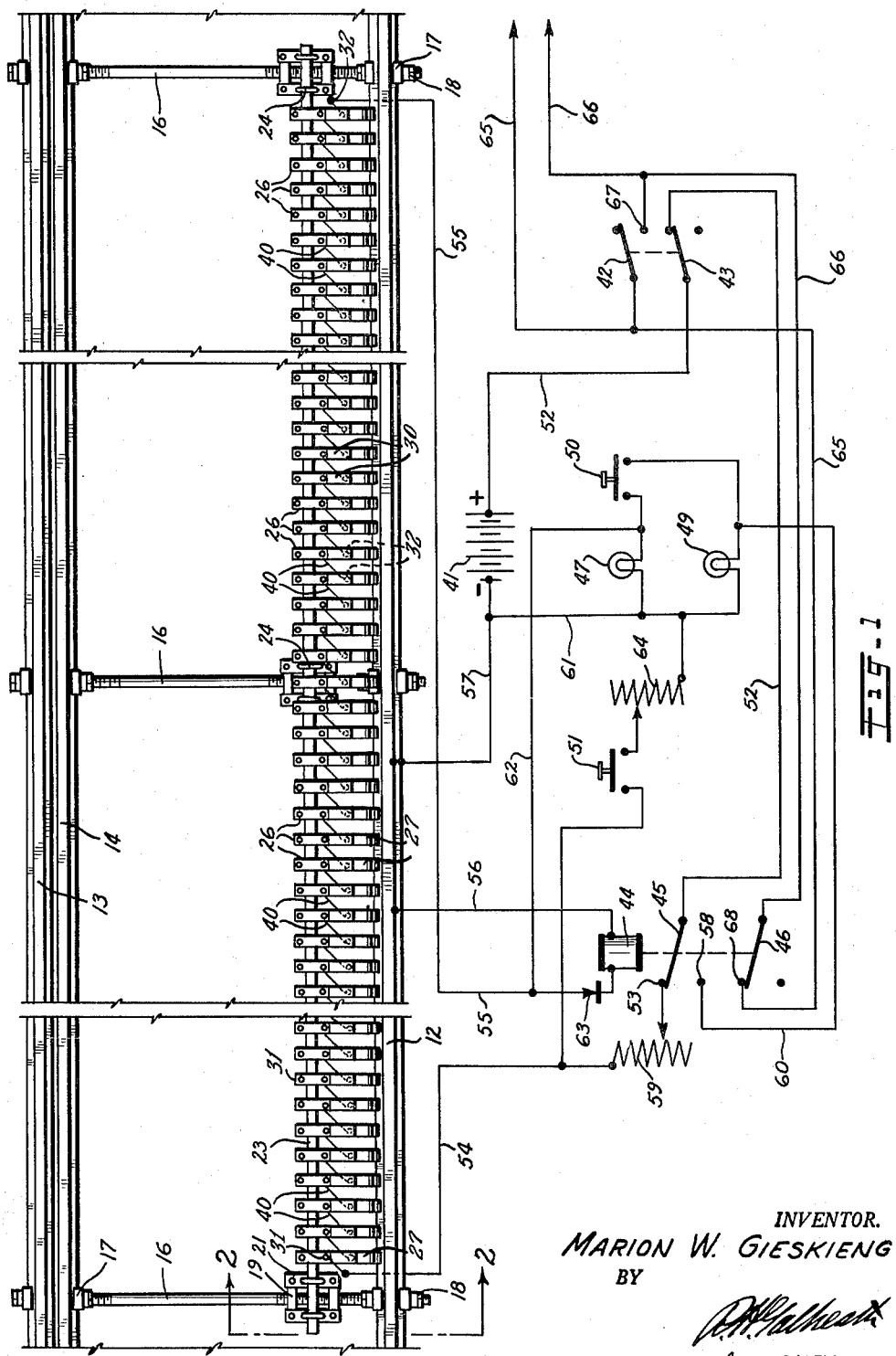
FIG. 1 is a fragmentary plan view of a section of railway track showing the invention applied to one of the rails with the connecting circuits diagrammed thereon.

In the drawing, one rail of a railway, which will be herein designated as the right rail, is indicated at 12 and the left rail is indicated at 13. In FIG. 1, the detector is illustrated applied to the right rail 12. A similar detector would be applied to the left rail 13 adjacent to and longitudinally spaced from the detector illustrated so that the left wheels of the train would be checked independently of the right wheels. In each case the gauge of the rails at the check points is slightly increased over the standard gauge and a guard rail 14 is positioned closely adjacent the rail opposite the detector to prevent transverse movement of the wheel axles and to maintain the wheel flanges spaced away from the rail to which the detector is applied as indicated in broken line at 15 in FIG. 2.

The improved wheel defect detector of this invention is applied to the track by clamping spaced-apart, threaded supporting bars 16 transversely of the track beneath the rails 12, 13 and 14 by means of rail clamps 17. The rail clamps 17 are clamped against the opposite sides of the bases of the rails by means of clamp nuts 18 threaded onto the supporting rod.

Each supporting rod is threaded through two spaced-apart nut yokes 19 from each of which two threaded studs 20 arise to support a nesting bar 21 horizontally between vertically adjustable clamping nuts 22. The nesting bars 21 are provided with semi-circular notches in each of which a longitudinally extending insulated supporting pipe 23 is clamped by means of U-bolts 24 and clamping nuts 25 so as to extend in spaced parallel relation to the rail 12. The supporting pipe is formed from a suitable tubular electrical non-conducting material. A plurality of flexible feelers or contact finger assemblies, designated in their entirety by the numeral 26, are clamped to the supporting pipe 23 in insulated, uniformly spaced relation and extend toward the rail 12. In actual use, the finger assemblies are spaced apart center-to-center a distance of 2¼ inches for a distance along the track exceeding the circumference of the largest expected wheel. A series of sixty-two fingers covering a track length of 11½ feet is a normal installation.

The contact finger assemblies 26 are similar in construction and each contains an elongated spring steel main conducting leaf 27 positioned below a flange contact leaf 48. The conducting leaf 27 has a pointed, up-turned extremity which forms a wheel contact point 28. The leaf 27 is flexibly stiffened by a plurality of spring leaves 29. A top stop bar 30 limits the upward movement of the assembly and the latter is free to be resiliently urged downwardly. The bar 30, the leaf 48, the leaves 29 and the conducting leaf 27 of each assembly 26 are drilled to receive a U-bolt 31 by means of which they are electrically connected as a unit and by means of which each entire assembly is rigidly clamped to the insulating pipe 23.

A flexible contact strip 32 and a snubber arm 33 are clamped below the free extremity of each conducting leaf 27 by suitable clamp bolts 34. The heads of the bolts are countersunk in a hardened steel flange pad 35 and the latter pad is insulated from the conducting leaf 27 and the contact strip 32 by means of suitable grooved nylon insulating blocks 36. The nylon insulating blocks 36 also serve to electrically insulate all of the latter elements from each other and from the bolts 34.

The contact strip 32 is thinner and more flexible than the conducting leaf 27 and the extremity of the contact strip is turned upwardly to form a second wheel contact point 37 slightly above the first contact point 28 of the leaf 27. An electric contact element 38 is mounted on the outer portion of the strip 32. The contact element 38 is constantly urged upwardly against and into electrical contact with the conducting leaf 27 by the inherent resiliency of the strip 32. Downward pressure on the contact point 37 flexes the strip 32 so as to break electrical contact between the contact strip 32 and the leaf 27 before the latter is flexed downwardly by the downward pressure.

The contact strip 32 of each finger assembly is connected, by means of a conductor 40, to the conducting leaf 27 of the next adjacent finger 26 so that throughout the entire series of fingers, the contact members 38 are in electrical series. The outer extremity of the snubber arm 33 is covered by an insulating cap 39 of electrical insulation and the insulated extremity is constantly urged upwardly beneath and against the ball of the rail, as shown in FIG. 2 to vertically align the upturned contact points 28 and 37 in close spaced relation along and above the inside of the rail.

It can be seen that if a normal flanged railway wheel rolls along the rail, its flange, if unbroken, will contact and roll over the flange pad 35 forcing the entire assembly downwardly, so that neither of the contact points 28 nor 37 will touch the wheel so that no electrical contact will be made with the wheel and the contact 38 will remain closed.

If the wheel has slipped on its axle so as to be in more or less than standard gauge position, the wheel flange will contact the conducting leaf 27 outwardly or inwardly from the insulated pad 35 and close a signal circuit as it forces the leaf downwardly. The flange contact leaf 48 will not move downwardly but will remain in position to contact the flange of a less than gauge wheel and close a circuit through the wheel and rail.

Should a portion of the wheel flange be broken away, there will be nothing at that point on the circumference of the wheel to push the finger assembly downwardly. Therefore, as a wheel rolls over the flange assembly, the second contact point 37 will contact the tread of the wheel and close a circuit through the wheel to the rail to operate a signal circuit. The pressure on the point 37 will then flex the contact strip 32 to open the contact at 38. The latter provides a second means to operate the said signal circuit should the first means fail and, in addition, the first contact point 28 will also contact the wheel to close a circuit through the latter and provide a third means to operate the signal circuit should both the previous means fail to operate.

Therefore, at each finger assembly, there are two independently operating signal circuit control means for detecting an out-of-gauge wheel, to wit: (1) the contact of the flange circumference with the conducting leaf 27 and, (2) the circuit closing contact of the flange contact leaf 48 with the side of the flange of the less than gauge wheel. At each assembly, there are three independently operating signal circuit control means to detect a broken flange, to wit: (1) the circuit closing contact between the tread of a broken-flange wheel, and the second contact point 37; (2) the circuit opening contact at the contact 38; and (3) the final circuit closing contact between the first point 28 and the wheel tread. This provides an unusual margin of safety against failure of any individual control means.

The signal circuit, the operation of which is controlled by the above described detector mechanism is diagrammatically illustrated in FIG. 1 in the operating position. The signal circuit employs a battery 41, a double pole, double throw service switch simultaneously actuating a block signal circuit closing blade 42 and a detector energizing switch blade 43, a relay 44 actuating two switch blades 45 and 46, a green signal lamp 47, a red signal lamp 49, a detector reset switch 50 and test switch 51 and a negative rail conductor 57 which connects the negative pole of the battery to the rail 12.

A positive lead 52 leads from the positive pole of the battery 41 through the closed switch blade 43 of the service switch to the switch blade 45 of the relay 44. The latter blade is closed on a contact 53 from which a first detector conductor 54 leads, through a variable resistance 59, to the terminal U-bolt 31 and conducting leaf 27 at one extremity of the detector. A second detector conductor 55 leads from the terminal contact strip 32 at the other extremity of the detector to the coil of the relay 44. A rail conductor 56 leads from the relay to the negatively charged rail 12.

Thus, it can be seen that we have a closed series circuit from the positive terminal of the battery 41 through the positive lead 52 and the service switch blade 43 to the switch blade 45 of the relay, thence, from the contact 53 through the resistance 59 and detector conductor 54 to the first conducting leaf 27 of the detector, thence, in series through conductors 40 and all of the contacts 38 of the detector to the relay 44 to maintain the switch blade 45 closed on the contact 53. Should the latter series circuit be broken or the current supply to the relay fail, the blade 45 will move from the contact 53 to open the relay circuit and will move into contact with a signal contact 58. The latter contact will close a circuit through a signal lead 60 to the red signal lamp 49 thence through a return conductor 61 to the negative pole of the battery to illuminate the red signal lamp and operate any other desired audible or visible signal equipment.

The green signal lamp 47 is connected to the negative return conductor 61 and the second detector conductor 55 through a reset conductor 62 and remains illuminated as long as the above series circuit is unbroken and current is flowing through the coil of the relay 44. The test switch 51 is connected between the negative conductor 61 and the detector conductor 54, through a variable resistance 64, and when closed shunts the relay coil through the resistance 64 to allow blade 45 to drop to contact 58 to illuminate the red signal lamp 49 to show that the detector is operating.

Now let us assume that a wheel with a broken flange rolls along the rail 12. The assembly 26 at the break will not be depressed and a first contact will be made between the contact point of that assembly and the wheel. This will cause a short circuit of the relay coil from the second detector conductor 55 through the wheel and the rail to the rail conductor 56. This short circuit will deenergize the relay so as to cause the switch blade 45 to break the current supply to the relay coil at the contact 53 and close the contact 58 to actuate the red light 49 and other signal equipment.

Now let us assume that the wheel contact with the point 37 for some reason did not close a circuit. The downward pressure upon the point, however, would break the circuit at the contact 38 of that contact finger assembly. This will immediately open the closed circuit through the series of normally closed contacts 38 to break the circuit between the detector conductor 54 and the second detector conductor 55 to de-energize the relay coil and allow the switch blade 45 to actuate as above described with reference to the short circuit.

Now let us assume that neither of the above assumptions were successful for some unknown reason. The wheel would then contact the point 28 of one of the conducting leaves 27 to short out the current supply to the relay as described above with reference to point 37 so as to actuate the red light and other signal equipment.

After the relay 44 has been deenergized for any of the above reasons, it must be reset for future use by closing the resetting switch 50. Closing of the latter switch closes a circuit from the positive lead 52, through the switch blade 45, the contact 58 and the reset conductor 62 to the second conductor 55 to energize the relay coil 44 so as to reset switch blade 45 on the contact 53 for the next successive operation.

A diode 63 is placed in series in the conductor 55 to the relay to eliminate delay in de-energizing the relay so as to obtain instantaneous actuation of the relay blades 45 and 46. The diode 63 prevents the reverse current flow induced in the relay coil by the sudden breaking and shorting of the coil from delaying dropping of the switch blade 45.

The above described wheel defect detector may be connected in series with the conventional closed warning block signal circuit of the railroad through the medium of block signal conductors 65 and 66 which can be connected together by closing the switch blade 42 on a contact 67 of the service switch when the wheel detector is out of service so as to maintain the block signal circuit closed so as not to disturb the normal operation of the block signal system. When the detector is operating, the block signal circuit is closed by the relay switch blade 46 and a contact 68 on the relay. When the relay 44 is deenergized in consequence of wheel defects, the normally closed block signal circuit will be opened at 46–68 to give a warning signal on the standard block system if desired.

In FIG. 4, an alternate form of contact finger is illustrated giving the same result as the above described fingers. This form of finger is mounted on a metal pipe 69 and contains a conducting leaf 70 and stiffening leaves 71 similar to the previous form. In this form a conventional normally closed micro-switch 72 is mounted below the extremity of the leaf 70 and the switch is provided with a metallic plunger sleeve 73 which is electrically connected to the conducting leaf 70. A depressible, metallic switch opening plunger 74 extends upwardly from and in electrical contact with the sleeve 73. A wheel flange pad or wear plate 75 is mounted on and insulated from the leaf 70 to be contacted by the wheel flange of a normal wheel and a snubber arm 76, with an insulating cushion cap 77, is provided as previously described.

In a complete detector, the micro-switches 72 are connected in series throughout the entire series of fingers and the terminal lead at one extremity of the entire series of switches, indicated at 78, is connected to the metal pipe 69 and the latter is connected to the positive terminal of a battery 79 through a resistor 80 by a conductor 87. The terminal lead at the other extremity of the entire series of micro-switches, shown at 81, is connected to the coil of a relay 82, similar to the previously described relay 44. The opposite side of the coil is connected to a contact 83 which is closed by a relay switch blade 84, similar to the switch blade 45. The blade 84 is connected by a first rail conductor 85 with the rail and a second rail conductor 86 leads from the rail to the negative terminal of the battery 79.

Thus, the circuit to the relay remains closed until one or more of the plungers 74 are pressed by a wheel, similarly to the depression previously described with reference to the contact point 37 and the contact 38. Depression of a plunger opens the circuit to the relay and actuates the signal circuit as previously described with reference to the relay 44.

A second means for actuating the signal circuit from the finger of FIG. 4 is as follows: All of the conducting leaves 70 of the latter fingers are electrically connected to the metal pipe 69 and the latter is suitably insulated from its supporting structure. Thus, the contact of the metallic plunger 74 with the wheel will completely short out the relay coil and allow the switch blade 84 to drop.

As in the previous form, the relay has a second positively charged switch blade 88, corresponding to the blade 46, which when the relay is energized closes a circuit through a green light 89 and when released closes a circuit through a red light 90.

Attention is called to the fact that should either of the rail conductors 56 or 57 of the first form or either of the rail conductors 85 or 86 or the pipe conductors 72 or 87 of the second form become accidentally broken or disconnected, the relays will be deenergized and the warning signals will be energized. Also should any of the detector elements be accidentally shorted to the rails by weather conditions, misplaced metal parts or dragging train equipment, the relay coil will be immediately shorted and deenergized to give a warning signal similar to that of a damaged wheel.

It is desired to call attention to the fact that the rail itself, due to the two rail conductors 56 and 57 of the first form and the two spaced-apart rail conductors 85 and 86 of the second form, forms a portion of the circuit to the coils of the relays 44 and 82. Therefore, any breaks in the rail conductors or their connections or any short circuits to the rail will immediately actuate the signal circuits.

While a specific form of the improvement has been described and illustrated herein, it is to be understood that the same may be varied, within the scope of the appended claims, without departing from the spirit of the invention.

Having thus described the invention, what is claimed and desired to be secured by Letters Patent is:

1. Means for detecting broken flanges on railway car wheels as the latter roll along the rail of a railway track comprising: bars secured to and extending between said rails; an elongated member supported by said bars parallel to one of said rails; a plurality of spaced-apart, depressible fingers secured to said elongated member at their one extremities and extending toward said rail in parallel relation at their other extremities; insulated means on said fingers to be contacted by the flange of a passing railway wheel for depressing said other extremities downwardly; a signal actuating circuit including said rail and said fingers; and an upwardly extending electric contact on each finger positioned to contact and short-out said electric signal actuating circuit through the tread of said wheel should the flange of said wheel fail to depress the finger as it passes.

2. A railway car wheel defect detector comprising: a flexible conducting leaf extending at right angles to and toward a rail of a railway track beneath and across the path of the flange of a normal railway car wheel so as to be depressed by said flange as the wheel rolls along said rail; an upturned tread contact point on the extremity of said leaf positioned in the path of the tread of said wheel to electrically contact the latter should said leaf fail to be depressed by a passing wheel due to a defect in the flange of said wheel; an electric relay coil; and a relay coil energizing circuit including: a switch blade actuated by said relay coil to close a relay coil contact when said coil is energized and to close a signal circuit contact when said coil is de-energized; a battery; a positive lead from said battery to said switch blade; a negative rail conductor from said battery to said rail; a first detector conductor from said relay coil contact to said conducting leaf; a second detector conductor from one side of said coil to said conducting leaf; and a rail conductor connecting the other side of said coil to said rail so that when said contact point makes contact with the tread of said wheel, the second detector conductor will be electrically connected through the wheel with the rail conductor to shortout the two sides of said coil to de-energize the latter to cause said switch blade to move from said relay coil contact to the signal circuit contact to energize a signal circuit.

3. A railway car wheel defect detector as described in claim 2 having a second means for de-energizing said coil comprising: a circuit opening switch attached to and insulated from said conducting leaf and positioned to be opened by contact with the tread of a passing defective wheel, said circuit opening switch being in electrical series between said conducting leaf and said second detector so that opening of said switch will open said relay coil energizing circuit to de-energize said coil to cause said switch blade to move from said relay coil contact to the signal circuit contact to energize said signal circuit.

4. A railway car wheel defect detector as described in claim 3 in which the circuit opening switch comprises: a contact strip attached to and insulated from said conducting leaf; an upturned extremity on said contact strip positioned adjacent to and extending above the upturned tread contact point on said conducting leaf; and electrical contact elements attached to said strip and said leaf and normally contacting each other to pass current therebetween until separated by tread pressure on the upturned extremity of said contact strip.

5. Means for detecting broken flanges on railway car wheels as described in claim 1 in which the means for supporting the elongated member comprises: two nut members threaded on each of said bars in spaced-apart relation; a threaded post arising from each of said nut members; a nesting member extending between and supported by said posts; means for clamping said elongated member to each of said nesting members; and means for clamping the extremities of said bars to said rails.

References Cited by the Examiner
UNITED STATES PATENTS

| | | | |
|---|---|---|---|
| 2,831,965 | 4/58 | Wallar | 246—246 |
| 3,021,423 | 2/62 | Gilbert | 246—246 X |

EUGENE G. BOTZ, *Primary Examiner.*

LEO QUACKENBUSH, *Examiner.*